UNITED STATES PATENT OFFICE.

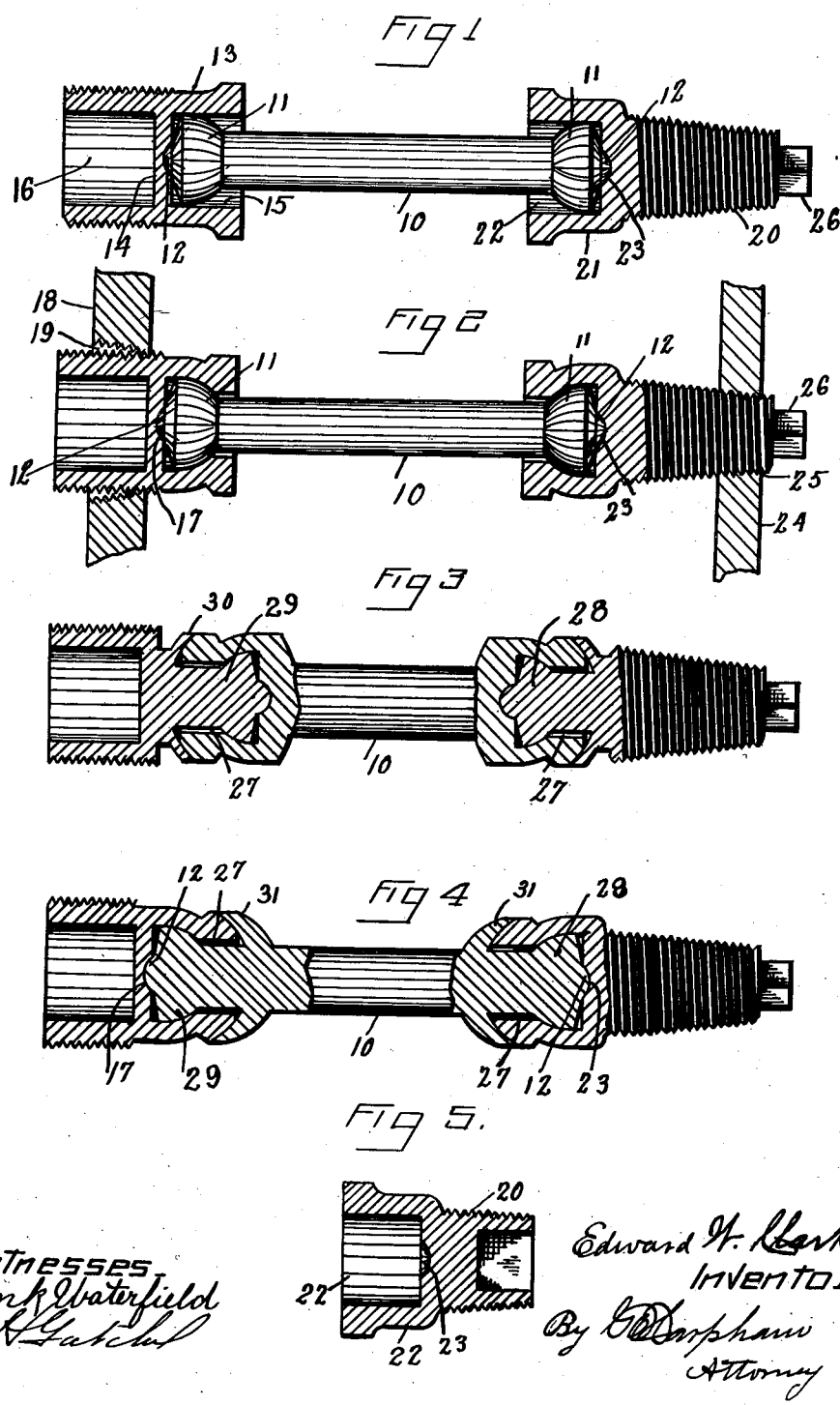

EDWARD W. CLARK, OF LOS ANGELES, CALIFORNIA.

STAY-BOLT.

1,029,104.  Specification of Letters Patent.  Patented June 11, 1912.

Application filed June 24, 1911. Serial No. 635,141.

*To all whom it may concern:*

Be it known that I, EDWARD W. CLARK, a citizen of the United States, residing at the city of Los Angeles, county of Los Angeles, State of California, have invented new and useful Improvements in Stay-Bolts, of which the following is a specification.

My invention relates to stay bolts for securing the fire-box of a boiler to the head or shell thereof; and the object thereof is to provide a flexible stay-bolt which can be quickly and accurately secured in place, and which will make steam tight joints and, at the same time, allow the ordinary vibration between the parts without any undue strain.

A further object is to produce a stay-bolt which may be positioned for use when the holes in the fire-box are not in perfect alinement.

Another object is to produce a stay-bolt which, when positioned for and in use, will keep the scale and dirt out of the joints and will remain flexible until the boiler is worn out.

I accomplish these objects by the stay-bolt described herein and illustrated in the accompanying drawings, forming a part hereof, in which:

Figure 1 is a side elevation partly in section of the parts of my bolt before being connected; Fig. 2 is a like view, with the parts connected and partly positioned in the fire-box and shell, a fragment of each being shown; Figs. 3 and 4 are side elevations, partly in section of modified forms of my bolt, with the parts connected ready for use; Fig. 5 is a modified form of the fire-box end of my bolt.

In the drawings, 10 is the shaft or central portion of the bolt. In Figs. 1 and 2, the shaft is provided with heads whose opposite surfaces 11 are preferably the frustum of a semi-globe. The other surfaces of said heads consist preferably of a small central rounded portion 12, which is preferably the frustum of a globe and will be termed the spacer head. From the spacer head, the surface slopes outwardly and away from the plane of the base of the spacer head to the outer edge of the head. The other end of the shaft has a like head. Upon one of the heads of the shaft is a tube or thimble 13 having a partition 14 therein, which divides the thimble into two parts or sockets, the inner 15, and the outer 16. In the surface of the partition in the inner socket 15 is a depression 17 of a configuration to receive the spacer head of the shaft. The outer edge of the inner socket is preferably thicker than the other parts to give it greater strength when swaged upon the head of the shaft, as shown in Figs. 2 and 4. The external surface of the thimble is screw-threaded so that it may be screwed into the shell 18 of the boiler. The thimble hole 19 is internally screw-threaded for the reception of the thimble, and the hole preferably tapers outwardly so that after the thimble is positioned it may be externally expanded in the manner customary with boiler tubes and make a steam tight joint of great holding power. The fire-box end of my bolt preferably consists of the solid tapered externally threaded body 20, having a head 21 provided with a socket 22, into which is received the other end of the shaft. The inner end surface of this socket has a depression 23 in which is received the spacer head of the other end of the shaft. The outer edge of this head is also preferably reinforced. The fire-box shell 24 has a threaded hole 25 into which this end of the bolt is screwed when positioned for use. The inner end 26 of body 20 is preferably square for the reception of a wrench which is used when the bolt is positioned.

In Fig. 3 I have shown the shaft 10 of my bolt terminating in sockets 27, which are swaged upon heads 28 and 29 of a configuration like the head of shaft 10 before described. In this form of bolt, the outer thimble has a head 29 which is received into the socket on the end of the shaft, and is held in place by having the walls of the socket swaged upon the head. This thimble has an annular flange 30 which is swaged down upon the end of the socket after the socket is swaged upon the head to prevent scale and dirt entering the socket when in use and freezing the head to the socket. The fire-box end of the bolt has a like head 28 as the outer thimble's head 29 and is connected to the shaft in like manner.

In Fig. 4, the construction of the bolt is the same as in Figs. 1 and 2, except that the shaft is provided near each head with an annular flange 31 which is swaged down upon the end of the socket after the socket is swaged upon the head to prevent scale and dirt entering the socket when in use and freezing the head to the socket. In positioning my bolt there will be an operator in the boiler who will be termed the inner man, and another on the outside who will be termed the outer man. The outer man will pass the fire-box end of the bolt through the outer shell and into the proper hole in the fire-box wall. The inner man, with a suitable wrench placed upon the square end of the bolt, screws this end into steam tight contact with the fire-box wall. At the same time, the outer man, with a proper tool, screws the outer thimble to its proper position in the outer shell of the boiler. It will be readily seen that the outer man can draw or push either the fire-box wall or outer shell at will. By having the entrance of the socket which incloses the head protected by a flange swaged down upon the end of the socket, all danger of scale or dirt entering or forming in the socket is prevented, and the parts are thereby prevented from freezing. By the use of my bolt, there is no danger of its breaking by reason of the vibration between the fire-box and outer shell due to unequal expansion; and the fire-box and outer shell can be quickly and perfectly connected, even though the holes in the respective parts are somewhat out of alinement.

If the fire-box end shown in Fig. 5 is used, after the same is positioned, the inner end would be expanded by the inner man, the same as a boiler tube, by the use of a suitable expander.

Having described my invention, what I claim is:

1. An improved flexible stay bolt, consisting of a shaft having heads and annular flanges near said heads; and end sections having sockets into which said heads are received and revolubly held by swaging said sockets upon said heads, said flanges being swaged down upon the ends of the sockets, said end sections being adapted to be secured in the outer shell and fire-box shell substantially as described.

2. An improved flexible stay bolt, consisting of a shaft having heads; a boiler shell section comprising an exteriorly threaded thimble having a partition therein, one end of said thimble being swaged upon one head of the shaft to revolubly connect the thimble and shaft; and a fire-box section comprising a body portion externally threaded and having in one end a socket into which is received and revolubly secured therein by swaging one head of the shaft.

3. An improved flexible stay-bolt consisting of sections adapted to be secured into the outer shell and fire-box shell; a connecting section revolubly connected to the outer shell and fire-box sections by swaging of some of the parts upon other of the parts, and a protective cover for the joints between the connecting and other sections.

In witness that I claim the foregoing I have hereunto subscribed my name this 16th day of June, 1911.

EDWARD W. CLARK.

Witnesses:
G. E. HARPHAM,
FRANK WATERFIELD.